INVENTORS
GARY J. HIMLER
OTTIE C. MITCHELL

AGENT

Feb. 19, 1963  G. J. HIMLER ETAL  3,078,457
RANGE TRACKING COMPUTER SYSTEM
Filed Dec. 19, 1957  5 Sheets-Sheet 3

INVENTORS
GARY J. HIMLER
OTTIE C. MITCHELL
BY
AGENT

INVENTORS
GARY J. HIMLER
OTTIE C. MITCHELL
BY John A. Duffy
AGENT

3,078,457
RANGE TRACKING COMPUTER SYSTEM
Gary J. Himler, Lakewood, and Ottie C. Mitchell, Whittier, Calif., assignors to North American Aviation, Inc.
Filed Dec. 19, 1957, Ser. No. 703,796
12 Claims. (Cl. 343—7.3)

This invention relates to radar tracking computer systems and more particularly to a range tracking computer system of simple design and versatile operation.

Systems for automatic tracking of a target are well-known in the field of radar. An important function of tracking systems is to provide a means for automatically computing the range of a target being tracked by the radar. Functionally, a range tracking computer receives a target video signal and a system timing signal from associated circuitry in the radar, generates range rate, range, and range gate signals at its output which are delivered to the associated fire control computer. The range rate signal represents the target's velocity relative to the airplane containing the tracking radar and may be used in the pilot's indicator. The range signal represents the distance of the target from the radar and is used in the associated computers in the fire control system. The range signal is also fed back into the range tracking computer to generate the range gating signal. The range gate signal is a signal delayed in time from the system trigger signal by an amount directly proportional to the range signal. The range gate signal is used as a gating circuit in the range tracking computer and to provide the pilot, through suitable indicating means, with a visual indication of the position of the gate signal relative to the range signal.

The continuing need in aircraft and missiles for improved range tracking has created many new exacting requirements which are not met by present-day range tracking systems. Among the more important requirements is a tracking system which tracks smoothly through false targets, signal fades, jamming, and the like. Another important requirement is the ability to search rapidly for the target and to track a high velocity target producing range information of pin point accuracy. In addition, the computer must be of few components with a maximum reliability.

In the past, range tracking computers and radar fire control systems have only partially met the above-listed requirements. Range tracking computers in the past possessed complicated circuitry having many components with low reliability. In addition, the systems were limited in sensitivity and ability to track targets of high velocity.

The automatic range tracking computer of this invention overcomes the disadvantages of prior systems and fulfills the above-listed requirements by providing a range tracking computer of a simple design and versatility of operation. Employing new and more effective electronic circuitry, the system provides a smooth range tracking of the target through signal fades, false targets, and pulse jamming. The computer will lock on to high velocities and seek targets with greater effectiveness than heretofore possible because of improved operation of the circuitry in the computer.

It is therefore an object of this invention to provide an improved automatic range tracking system.

It is another object of this invention to provide an automatic range tracking system with improved tracking characteristics.

It is a further object of this invention to provide a range tracking system which tracks smoothly through signal fades, false targets, and pulse jamming.

It is a still further object of this invention to provide an automatic range tracking computer which automatically locks on to a high velocity and weak signal target.

It is another object of this invention to provide an automatic range tracking computer with improved velocity memory characteristics through signal fading of the target.

Other objects of this invention will become apparent from the following description taken in connection with the accompanying drawings, in which FIG. 1 is a block diagram of the invention;

The range tracking computer of this invention may operate in a number of different ways. One way, occurs when target acquisition is first accomplished by manual control means known as manual search mode, which may be, for example, the pilot's stick, and then after lock-on of a target has occurred, target tracking is accomplished by automatic tracking means. Another way target acquisition is first accomplished by automatic search control means known as automatic search mode which provides an automatic search of predetermined range limits. After lock-on of a target is detected, target tracking is accomplished by the automatic tracking means in the automatic tracking mode.

Figure 1:
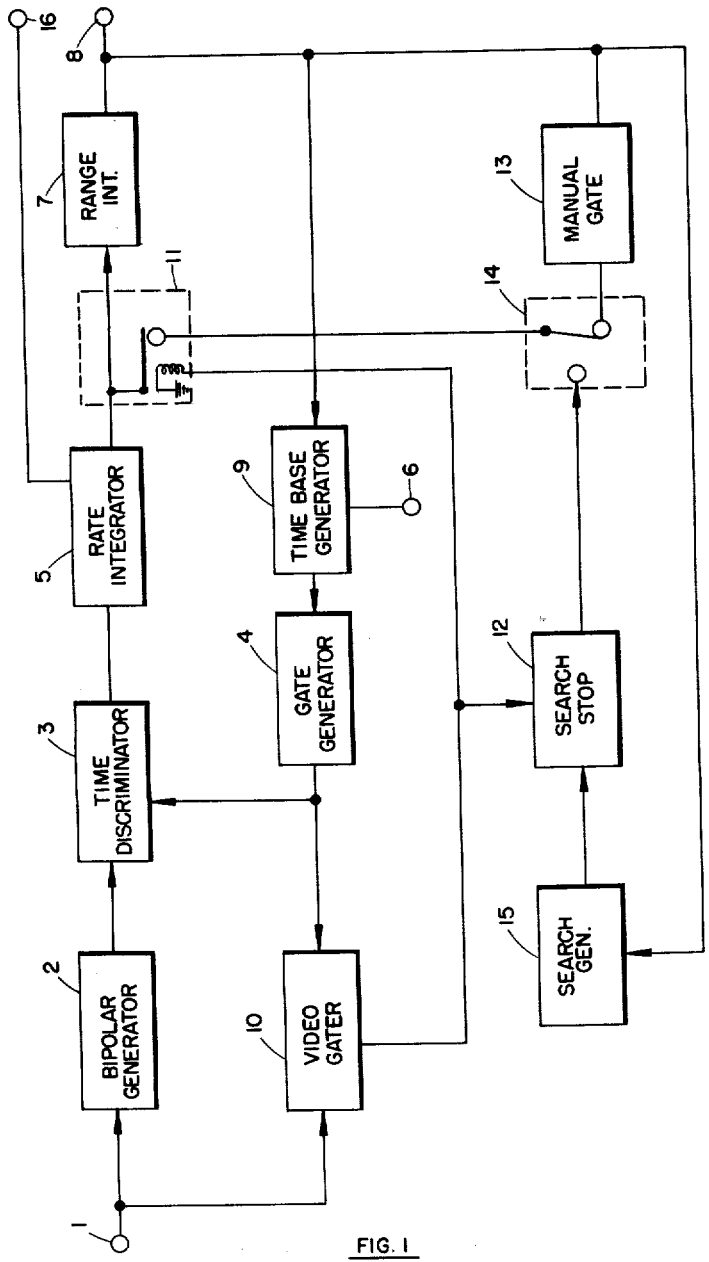

Referring now to FIG. 1, there is shown in schematic block form the essential functions of the computer which provide the improved automatic range tracking system of the invention. A source of video pulses received from the target by the radar associated with the range tracking computer is applied to input terminal 1. The video signal is bipolarized by bipolar generator 2 which provides a signal to time discriminator 3 which consists of the amplified input video followed immediately by the positive reflection of the negative video signal. Time discriminator 3 compares the video signal received from bipolar generator 2 with a range gate signal received from gate generator 4 and generates an error signal which is proportional to the time displacement between the video signal and the range gate signal. The error signal produced by time discriminator 3 is then applied to rate integrator 5 which generates a signal at output terminal 16 which is proportional to the rate of change to the range of the target. The output of rate integrator 5 is also fed to range integrator 7 which produces a signal in output terminal 8 which is proportional to the range of the target. The range signal at terminal 8 is fed to indicating devices in the radar system and also to time base generator 9 where it is combined with a system trigger signal received at terminal 6 from associated radar circuitry. Time base generator 9 generates a range gate delayed in time from the trigger signal at terminal 6 by an amount proportional to the range signal received from terminal 8. The output of time base generator 9 is used to trigger gate generator 4. The range gate signal from gate generator 4 is also fed into video gater 10 along with a video signal from input terminal 1. Video gater 10 detects coincidence between the video signal and the range gate signal and feeds an output signal to on-target switch 11 and search stopper 12. On-target switch 11 disconnects the search voltage from the range integrator 7. When switch 11 is in one position, range signals are provided from terminal 8 through manual gate 13, search control switch 14, and on-target switch 11 to range integrator 7. Thus, in manual search mode, search signals are generated in manual gate 13 to provide the input signal to range integrator 7 until coincidence between the video signal and the range gate signal from generator 4 is detected by video gater 10 at which time on-target switch 11 switches the operation from manual earch to automatic track mode. In addition to manual search, an automatic limited range search mode may be provided by connecting control switch 14 from on-target switch 11 to search stopper 12 instead of manual gate 13. A circuit results thereby in which range signals from terminal 8 are fed to search generator 15 which generates signals to provide a predetermined limited search of the target. For further description of switch 11 see description relating to FIG. 4 described below. Search generator 15 provides the search signal in the automatic search mode of operation. Coincidence in video gater 10 between the range gate signal from gate generator 4 and the video signal disconnects search generator 15 from range integrator 7 by action of search stopper 12.

As noted previously, three different types of mode operation may occur in the range tracking system of FIG. 1. These are the manual search, the automatic search, and the automatic track modes. Target acquisition is accomplished in the manual search mode wherein switch 14 connects manual gate 13 to range integrator 7 through on-target switch 11. Manual gate 13, which may be controlled for example by the pilot in an aircraft, generates a search signal in accordance with manual control until the desired target is coincident with the range gate signal generated by gate generator 4. Upon coincidence, video gater 10 produces an output signal to on-target switch 11 which disconnects manual gate 13 from the circuit. The system now operates in the automatic tracking mode. Time discriminator 3 compares the bipolar video signal received from bipolar generator 2 with the range gate signal received from range gate generator 4 and produces an error signal whose magnitude is proportional to the displacement between the range gate and the bipolar video, and whose polarity indicates the direction of the displacement. The error signal from time discriminator 3 is fed to rate integrator 5 which produces a signal at terminal 16 which is proportional to range rate. The output of rate integrator 5 is also applied to range integrator 7 which produces a signal at terminal 8 which is proportional to range. The range signal from terminal 8 is also fed to time base generator 9 which develops a range gate triggering signal in accordance with the system trigger signal from terminal 6 and the range signal from terminal 8. Time base generator 9 triggers gate generator 4. The range gate signal generated by gate generator 4 is then fed to time discriminator 3 and the cycle repeats. In this manner, range signals are continuously and automatically produced at terminal 8 in addition to the rate signals produced at terminal 16.

Turning now to the automatic search operation of the system, switch 14 may be manually operated to connect the input of on-target switch 11 to the output of search stopper 12. Search generator 15 produces a search voltage in accordance with range input signals from terminal 8 which is limited to a predetermined range search distance. The signal from search generator 15 is fed through search stopper 12, switch 14, and on-target switch 11 to range integrator 7 which produces range signals in response thereto. Operation of search generator 15 is automatic and continuous until coincidence of the video signal nad the range gate signal is detected by video gater 10. Video gater 10 then produces a signal which causes search stopper 12 to electronically disconnect search generator 15 from the circuit. In addition, on-target switch 11, in response to the video gater signal, disconnects search stopper 12 from range integrator 7 and the automatic tracking mode commences provided that the video signal was not from a false target.

Figure 2:
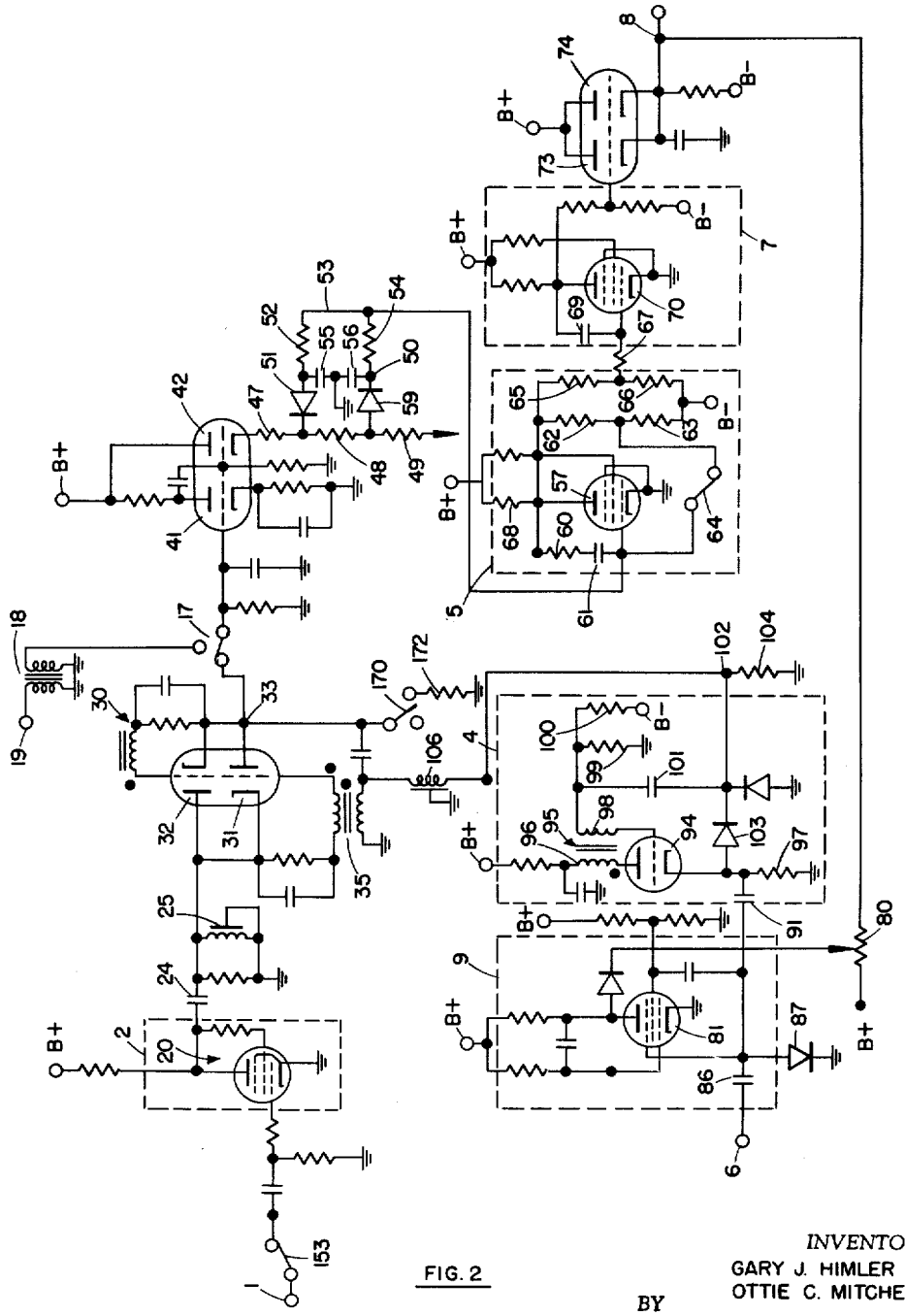
FIG. 2 is a schematic diagram of the invention showing the automatic tracking mode of the computer when the radar is locked on the target.

Referring now to FIG. 2, there is shown a schematic diagram of the circuitry producing automatic tracking mode. Positive video pulses from the target are received by input terminal 1 and coupled through the open contacts 153 of de-energized reject relay 151 (not shown) to the input of bipolar generator 2. Operation of relay 151 will be described in relation to FIG. 4. Bipolar generator 2 comprises pentode 20 which amplifies positive video pulses received at its grid and couples the output from its plate through capacitor 24 to delay line 25. The negative amplified video pulse at the plate of pentode 20 is inverted and delayed by the delay line. Thus, a signal is produced in the output of delay line 25 which consists of the amplified and inverted input video pulse followed immediately by the positive reflection of the negative video. The bipolar video signal is compared in bidirectional switch 30 which comprises two triodes 31 and 32 with the cathode of triode 31 and the anode of triode 32 connected in common to receive the video signal. The grids of triodes 31 and 32 are connected to receive gating signals from gate generator 4 through transformer 35. Output terminal 33 of bidirectional switch 30 is connected to audio amplifier 41. Terminal 33 is also connected through normally closed contacts 170 of relay 168 (not shown) and resistor 172 to ground. Contacts 170 and resistor 172 operate to provide gain control of the output of bidirectional switch 30 thereby providing an adjustable bandwidth. Contacts 170 are maintained open, as shown in FIG. 2, by circuitry to be described in relation to FIG. 4 during the time when no signal is being received from the target. This provides a relatively high gain at the output of switch 30 thereby producing a wide bandwidth allowing the computer to readily acquire weak and/or fast targets. Upon coincidence, circuitry to be described later, closes contacts 170 reducing the time duration of the signal, thereby the bandwidth, from switch 30 allowing the computer to track targets regardless of noise, jamming, signal fades or the like. The output of audio amplifier 41 is coupled to the input of cathode follower tube 42 which is fed to a voltage divider circuit consisting of resistors 47, 48, and 49 connected in series between the cathode of tube 42 and B—. Connected to the circuit of resistors 47, 48, and 49 is peak detector circuit 50. Diode 51 is connected to the junction of resistors 47 and 48 and diode 59 is connected to the junction of resistors 48 and 49. Diode 51 is connected through summing resistor 52 to terminal 53 and allows direct current to flow therein. Diode 59 is connected through summing resistor 54 to terminal 53 and allows a direct current to flow therein. Capacitors 55 and 56 filter for peak detector 50. Terminal 53 feeds an error signal to the control grid of pentode 57 which forms rate integrator 5. Resistor 60 and capacitor 61 couple the plate to the control grid to produce integrating action in the tube. Resistors 62 and 63, connected in series between the plate and B—, have a midpoint connected through contacts 64 to the grid of pentode 57 to provide a zero rate signal through the closed contacts 64 of energized on-target relay 160 (not shown) when the system is in search mode. Resistors 65 and 66, connected in series across resistors 62 and 63, together with resistor 67 which is connected to the midpoint of resistors 65 and 66, form a voltage divider circuit which couples the rate output signal from the plate of pentode 57 to the grid of pentode 70. Pentode 70 forms range integrator 7, which operates in the same manner as described for pentode 57 to produce a signal at its plate which is the range signal fed to terminal 8 through cathode follower tubes 73 and 74. The range signal from terminal 8 is fed back through potentiometer 80 to the plate of pentode 81 which comprises time base generator 9. Pentode 81 operates as a phantastron, and receives a positive triggering pulse from input terminal 6 through capacitor 86 and trigger injecting diode 87 on its suppressor grid. The anode and control grid of pentode 81 are degeneratively coupled to establish a negative feedback type integrating circuit known in the art as a Miller circuit. The output of pentode 81 is taken from the suppressor grid and coupled through capacitor 91 to the cathode of triode 94, which operates as a blocking oscillator. The anode of triode 94 is connected through primary winding 96 of transformer 95 to B+ and the cathode is connected through load resistor 97 to ground. The control grid of triode 94 is connected through secondary winding 98 of transformer 95 to one end of resistor 99 which functions as a grid return resistor having its other end connected to ground. Secondary winding 98 also provides a path for the grid of triode 94 through grid bias resistor 100 to B—. B— is at a sufficiently lower voltage than ground to insure cutoff of triode 94 during intervals between input pulses. A storage capacitor 101 has its lower or negative plate connected to the grid of triode 94 through secondary winding 98. The upper or positive plate of capacitor 101 is connected to point 102, which is the output of gate generator 4. Diode 103 couples the cathode of triode 94 to point 102. The output pulse at terminal 102 is a substantially square wave and depends primarily on the ratio of turns in windings 96 and 98 of transformer 95 for its squareness, on storage capacitor 101 for its width, and on resistors 97 and 104 for its amplitude. Point 102 is connected through suitable delay means 106 to transformer 35. Switch 17 is connected between the output of amplifier 41 and the output of switch 30 to alternatively provide a signal to amplifier 41 from switch 30 or from terminal 19 through transformer 18. Terminal 19 is responsive to elevation error signal from a system such as monopulse radar, thereby permitting automatic range tracking.

In operation of FIG. 2, bipolar video signals received from bipolar generator 2 are compared in bidirectional switch 30 with a range gate signal applied from gate generator 4. The gate signal from generator 4 biases triodes 31 and 32 to conduction. Thus, for the duration of the range gate signal, the path between input terminal 1 and the output signal through bidirectional switch 30 is completed, permitting current flow in either direction through switch 30. When the range gate signal supplied by gate generator 4 leads in time the incoming bipolar video signal, current flows through triode 31 and the signal from switch 30 is a negative error signal. Conversely, when the range gate signal lags in time the video signal, a positive error signal is obtained at the output of detector 30. Triode 41, acting as a high gain audio amplifier, receives the output error signal from detector 30 and delivers a signal to cathode follower triode 42. Resistors 47, 48, and 49 connected to the cathode of triode 42 form a voltage division such that the cathode of diode 51 is slightly positive with respect to its anode, and the anode of diode 59 is slightly negative with respect to its cathode. In the absence of signal, this back bias disconnects the time discriminator from its load connected to terminal 53. Since resistor 49 is large compared to resistors 47 and 48, the error pulses applied to diodes 51 and 59 are essentially equal in amplitude. When the error signals at resistor 48 are positive enough to overcome the back bias signal, diode 59 conducts, causing current flow through resistor 54 to output terminal 53. When the error signals are negative, diode 51 conducts, causing current to flow through resistor 52 to output terminal 53. The error signal at terminal 53 is a low impedance D.-C. signal proportional in amplitude to the amount of misalignment between the bipolar video signal and the range gate signal. Its polarity is determined by the direction of misalignment. The error signal at terminal 53 is impressed on the grid of pentode 57 of rate integrator 5 which causes the plate to increase or decrease in a linear fashion from the point of original setting. Integrating action in the pentode 57, caused by resistor 68 and capacitor 61 produces an output at the anode which is proportional to the derivative of the error signal at terminal 53. This is the range rate signal which is fed to terminal 16 and from there to the interested points in the associated radar circuitry. The range rate signal produced at the anode of pentode 57 is coupled through the voltage division circuit through resistors 65, 66, and 67 to the grid of pentode 70 which integrates the rate signal and produces an output at its plate which is the range signal. The range signal is connected by the cathode follower circuit of triodes 73 and 74 to output terminal 8. The range signal at terminal 8, which is a true indication of the instantaneous range of the target is sent to associated radar circuitry and indicating devices. The range signal is also fed from terminal 8 to the input of time base generator 9 through potentiometer 80. A triggering pulse from input terminal 6 applied to the suppressor grid of pentode 81 in time base generator 9 causes current to flow from the cathode to the anode thereof, and the plate potential immediately falls. A square wave produced at the suppressor grid of pentode 81 is differentiated by capacitor 91 and resistor 97. The negative pulse obtained from the edge of this square wave triggers the blocking oscillator of gate generator 4. A square wave pulse generated by the blocking oscillator of gate generator 4 is then compared in time discriminator 3 with the bipolar video pulse. Thus, it can be seen that a closed feedback loop is maintained between the output terminal 8, the range signal, and the comparison means in time discriminator 3 whereby a signal is generated at terminal 8 which is at all times a measure of the range of the target.

Figure 3:
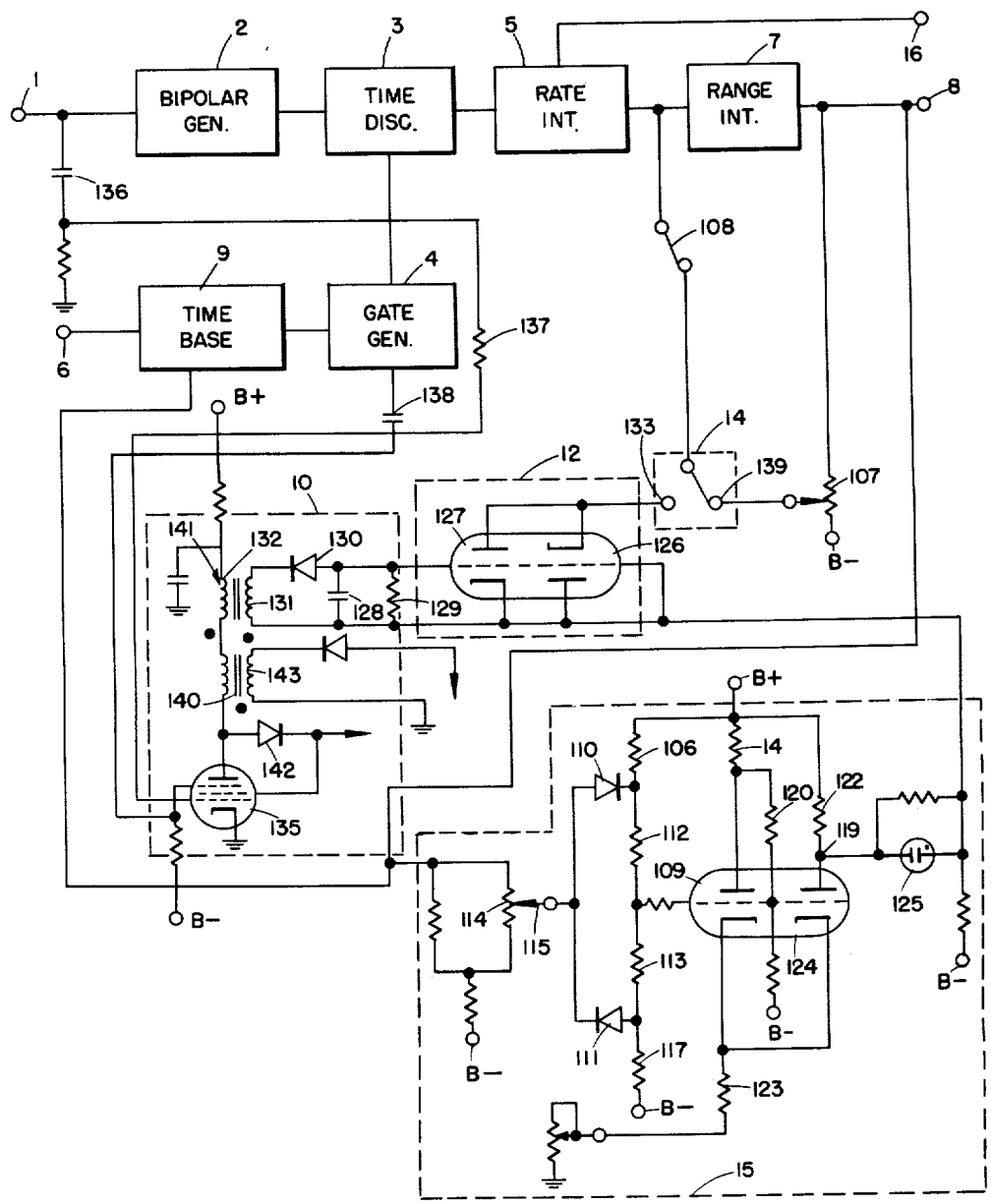
FIG. 3 is a schematic diagram of the invention showing the operation of the system during automatic and manual search.

Turning now to FIG. 3 there is shown in schematic diagram the circuitry which provides the manual and automatic search modes. The circuitry which provides the automatic tracking mode described in FIG. 2 in detail is shown in FIG. 3 in block form only for simplicity reasons. In manual search mode, the range signal at output terminal 8 is fed through slewing potentiometer 107 and switch 14 in the manual search position 139 through closed contacts 108 of energized on-target relay 160 (not shown) to the input of range integrator 7. Potentiometer 107 is provided with a wiper which is manually adjusted to generate range rate signals. In manual search mode range feedback is established from terminal 8 by potentiometer 107, to range integrator 7, and fed to output terminal 8. Circuitry to be described later in relation to FIG. 4 disconnects the output of switch 14 from the input of range integrator 7.

In the automatic search mode, range signals from terminal 8 are connected to the input of search generator 15. A range signal from terminal 8 is coupled to the grid of triode 109 through a pickoff circuit consisting of diodes 110 and 111, connected in series across resistors 112 and 113, and arranged in polarity so that the plate of diode 110 and the cathode of diode 111 are connected in common to receive the input range signals from terminal 8. Resistor 114, having a wiper 115 attached thereto, is interposed between terminal 8 and the pickoff circuitry to provide for the adjustment of range voltage to be generated by search generator 15. Triode 109 is coupled with triode 119 to form a multivibrator, known in the art as a Schmidt trigger circuit. The output of the Schmidt trigger circuit is a square wave which appears at the plate of triode 119. The Schmidt trigger operates as a bistable multivibrator producing square waves proportional to the input signal to terminal 8, together with the limits established by the associated circuitry. The plate of triode 119 in the output circuit of search generator 15 is coupled through neon tube 125 to the input of search stopper 12. Neon tube 125 serves as a low impedance coupling device between the search generator 15 and search stopper 12. Triode 126, in cooperation with triode 127, form search stopper 12. Triode 126 functions as a diode and will conduct when the input signal to the grid of triode 126 is positive. Triode 127 will conduct when the input from search generator 15 is negative. The plate of triode 126 is connected in common with the cathode of triode 127 and the grid of triode 126 to the output of search generator 15. The plate of triode 127 is connected in common with the cathode of triode 126 to automatic search contact 133 of control switch 14. A charging circuit is provided to control conduction in triode 127 in response to a signal from video gater 10. The circuit comprises capacitor 128 and resistor 129 connected in parallel across each other and between the grid and cathode of triode 127. Diode 130 connects one end of the circuit to transformer 132 of video gater 10. The other end of winding 131 is connected to the other end of the charging circuit. Capacitor 128 is charged through diode 130 and cuts off triode 127 when charged. Triode 126 conducts positive pulses from search generator 15 to control switch 14 and triode 127 conducts negative pulses. Thus, when capacitor 128 is charged, cutting off triode 127, negative pulses from search generator 15 are disconnected from control switch 14. Control switch 14 in the automatic search position is connected through contacts 108 of on-target relay 160 (not shown) to the input of range integrator 7. In search mode, search generator 15 provides the search signals to range integrator 7. Circuitry to be described in relation to FIG. 4 disconnects these search signals from range integrator 7 during automatic track mode of operation. In order to switch from search mode to automatic tracking, video gater 10 provides the necessary control signals. Video gater 10 is a coincidence circuit which comprises a pentode 135 which receives video input signals from terminal 1 through capacitor 136 and resistor 137 at its control grid, and range gate signals from the output of gate generator 4 through capacitor 138 to its suppressor grid. Pentode 135, normally non-conducting, will conduct upon application of a positive video signal at its control grid and a positive range gate signal at its suppressor grid. Only simultaneous application of video and range gate signals will cause the tube to conduct. Upon conduction of pentode 135, current flowing through the primary of transformer 132 connected to the plate of pentode 135 induces a voltage in secondary winding 131 which produces a negative charge on capacitor 128, thereby cutting off triode 127 in search stopper 12. The primary winding of transformer 140 likewise induces a voltage in secondary winding 143 which controls on-target relay 160 (not shown).

In operation of manual search mode in FIG. 3, a manual search signal produced by varying the potential at potentiometer 107 is fed through contact 139 of control switch 14 and closed contacts 108 of energized on-target relay 160 to the input of range integrator 7. Manual search signals are supplied to range integrator 7 which produces range signals at terminal 8 until such time as the range gate is coincident with the video signal at terminal 1. When the gate signal produced by gate generator 4 which is responsive through time base generator 9 to the range signal at terminal 8 arrives at the suppressor grid of pentode 135 in video gater 10 at the same time the video signal from terminal 1 arrives at the control grid of pentode 135, the tube commences conduction, and the current flowing in the primary of transformer 132 reduces the voltage in the secondary winding 131 which charges capacitor 128 cutting off triode 127 and disconnecting search generator 15 from contact 133 of control switch 14. The current flowing in the primary winding of transformer 140 induces the voltage in secondary winding 143 which de-energizes relay 160 and opens the contacts 108 through circuitry to be described in relation to FIG. 4. When contacts 108 are open, the search voltage is disconnected from range integrator 7. Automatic tracking commences and continues.

Automatic search occurs when control switch 14 connects contact 133 through closed contacts 108 to range integrator 7. The range signals of terminal 8 are converted by the Schmidt trigger multivibrator circuit in search generator 15 to negative square wave output signals at the plate of triode 119 which are coupled through triode 127 of search stopper 12 and control switch 14 to the input of range integrator 7. Coincidence between the range gate and video is detected by comparing the video signal with the range gate signal generated by gate generator 4 in video gater 10. Conduction of pentode 135 causes current flow in transformer 132 which induces a voltage in secondary winding 131 charging capacitor 128 negatively, which cuts off triode 127. This disconnects the output of search generator 15 from the input of range integrator 7.

Figure 4:
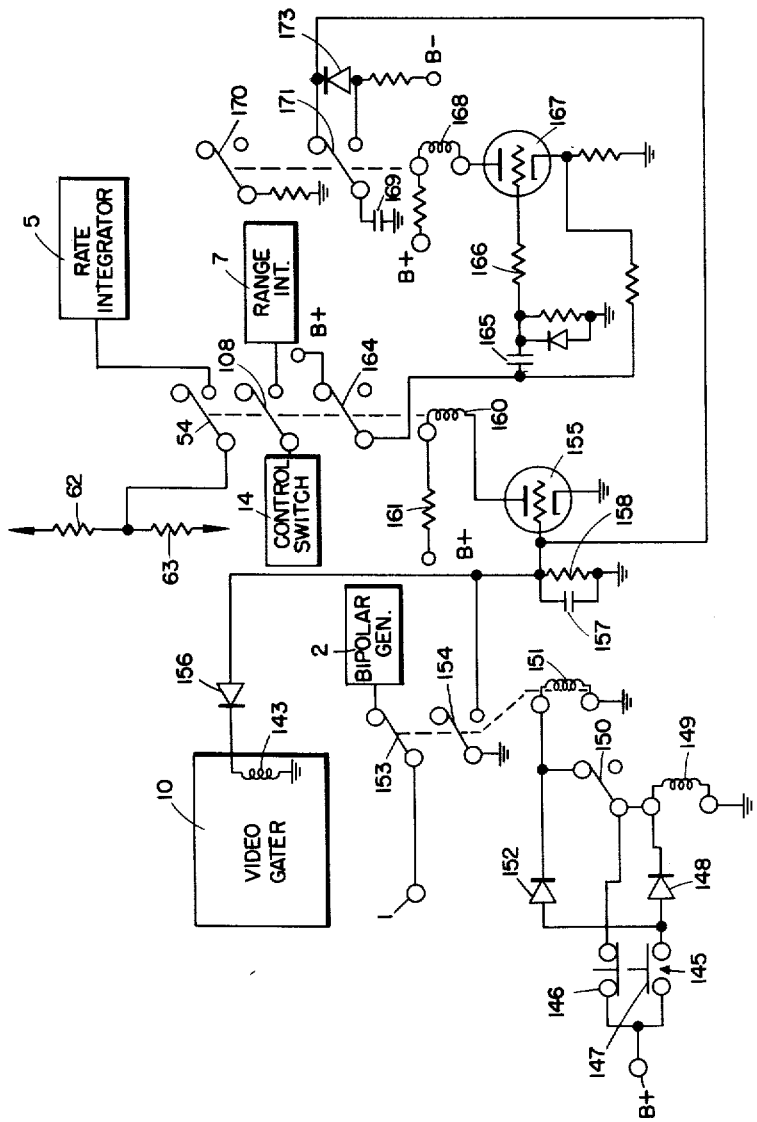
FIG. 4 is a schematic diagram showing the interlocking circuitry which controls the switching from one operation to another.

Turning now to FIG. 4, there is shown the control circuitry which provides for the connecting and disconnecting of the various different modes of the system of operation. As described before, the tracking system of this invention operates primarily in two ways: in the first way, the manual search mode of operation is first utilized to lock the computer onto the target, at which time the system will automatically switch to the automatic tracking mode of operation. In the second way of operation, target acquisition is accomplished automatically by the searching with search generator 15. When the search mode has acquired a target, the system again automatically switches to the automatic mode of operation. In FIG. 4 in the manual search mode, target acquisition may be accomplished momentarily by controlling the action of manual control switch 145 which comprises a resume search switch 146 which is normally closed and an action-reject switch 147 which is normally open. Action switch 147, when depressed, energizes action relay 149. Depressing search switch 146 de-energizes reject relay 151. Diode 152 provides a circuit from B+ through switch 147 to actuate the coil of relay 151 when action switch 147 is depressed. Thus, relay 149 is energized upon the depressing of switch 147 and de-energized in the normal position of switch 147. Relay 151 is normally energized by a circuit through search switch 146 and the normally closed contacts 150 of de-energized relay 149. Relay 151 is de-energized upon actuation of search switch 146. Contacts 153 of relay 151 connect input terminal 1 to bipolar generator 2 and video gater 10 when normally closed and disconnect input terminal 1 from the circuitry when open by the energization of the coil of relay 151. Contacts 154 of relay 151 provide a ground signal for the grid of triode 155 when relay 151 is energized. Triode 155 provides the control for on-target switch 11 of FIG. 1. The grid of triode 155 is connected to receive a signal from video gater 10 by being connected through diode 156 to one end of secondary winding 143. Triode 155 is conducting when no signal is received from gater 10 and is cutoff by a negative signal denoting coincidence. Capacitor 157 is connected in parallel with resistor 158 between the grid of triode 155 and ground to provide the necessary bias operation. Triode 155 has its plate connected through the coil of relay 160 and resistor 161 to B+ and has its cathode connected to ground. Open contacts 54 of relay 160 connect the input of rate integrator 5 to resistors 62 and 63 shown more particularly in FIG. 2 to provide a zero output from rate integrator 5 when the system is in search mode. Closed contacts 108 (on-target switch 11 of FIG. 1) of energized relay 160 connect range integrator 7 to control switch 14 during search mode. Open contacts 164 of relay 160 connect B+ and one side of capacitor 165 when relay 160 is de-energized. The other side of capacitor 165 is connected through resistor 166 which forms a differentiating circuit with capacitor 165 to the grid of triode 167. The plate of triode 167 is connected through the energizing coil of relay 168 to B+ and its cathode is connected to ground. Triode 167 is connected to conduct when contacts 164 are opened by de-energized relay 160, receiving a B+ signal through capacitor 165 and resistor 166 at its grid. A time delay circuit comprising memory capacitor 169, contacts 171, diode 173 and capacitor 157, provides for memory of the target by the computer for a predetermined time after coincidence is lost denoted by the loss of a negative signal from video gater 10. During coincidence, a negative coincidence signal from video gater 10 maintains a negative signal on the grid of triode 155 thus maintaining the tube cutoff. Triode 167 is normally conducting, keeping relay 168 energized, thereby keeping a bias voltage on capacitor 169. When a coincidence signal is received, tube 155 cuts off, closing relay 160 and thereby contacts 164. This applies a positive potential to capacitor 165, the grid of triode 167, and a lesser potential to the cathode of triode 167, maintaining triode 167 conducting. When capacitor 165 charges, the grid of triode 167 is returned to ground cutting off triode 167 which, in turn, de-energizes relay 168 transferring the charge on capacitor 169 to capacitor 157, thus providing a memory.

In operation of FIG. 4 it will first be assumed that the computer is being operated in the manual search mode. Initially the computer is operating in the manual search mode with search switch 146 depressed to de-energize relay 151. Open contacts 154 of de-energized relay 151 do not provide a cutoff bias signal to the grid of triode 155 which is normally conducting. Relay 160 is energized providing a connection between control switch 14 and closed contacts 108 to range integrator 7. Rate integrator 5 is held at zero rate by the connection of the circuit of resistors 62 and 63 through closed contacts 54. Upon release of search switch 146 and coincidence between the video signals and the range gate signals, video gater 10, detecting coincidence, presents a signal to the grid of triode 155 which cuts off de-energizing relay 160. Open contacts 54 disconnect the rate feedback signal allowing rate integrator 5 to provide signals to range integrator 7. Open contacts 108 disconnect control switch 14 from range integrator 7 and the system is now in automatic track mode. Upon loss of coincidence from conducting, triode 155 no longer receives a cutoff bias signal from video gater 10. Triode 155 is prevented from conducting for a small time by the circuit from ground through capacitor 169, contacts 171 of relay 167 connected to the grid of triode 155. After a predetermined time delay, triode 155 conducts, returning the operation of the computer to search mode. Operation of the circuitry of FIG. 4 is the same for the automatic search mode.

Figure 5:
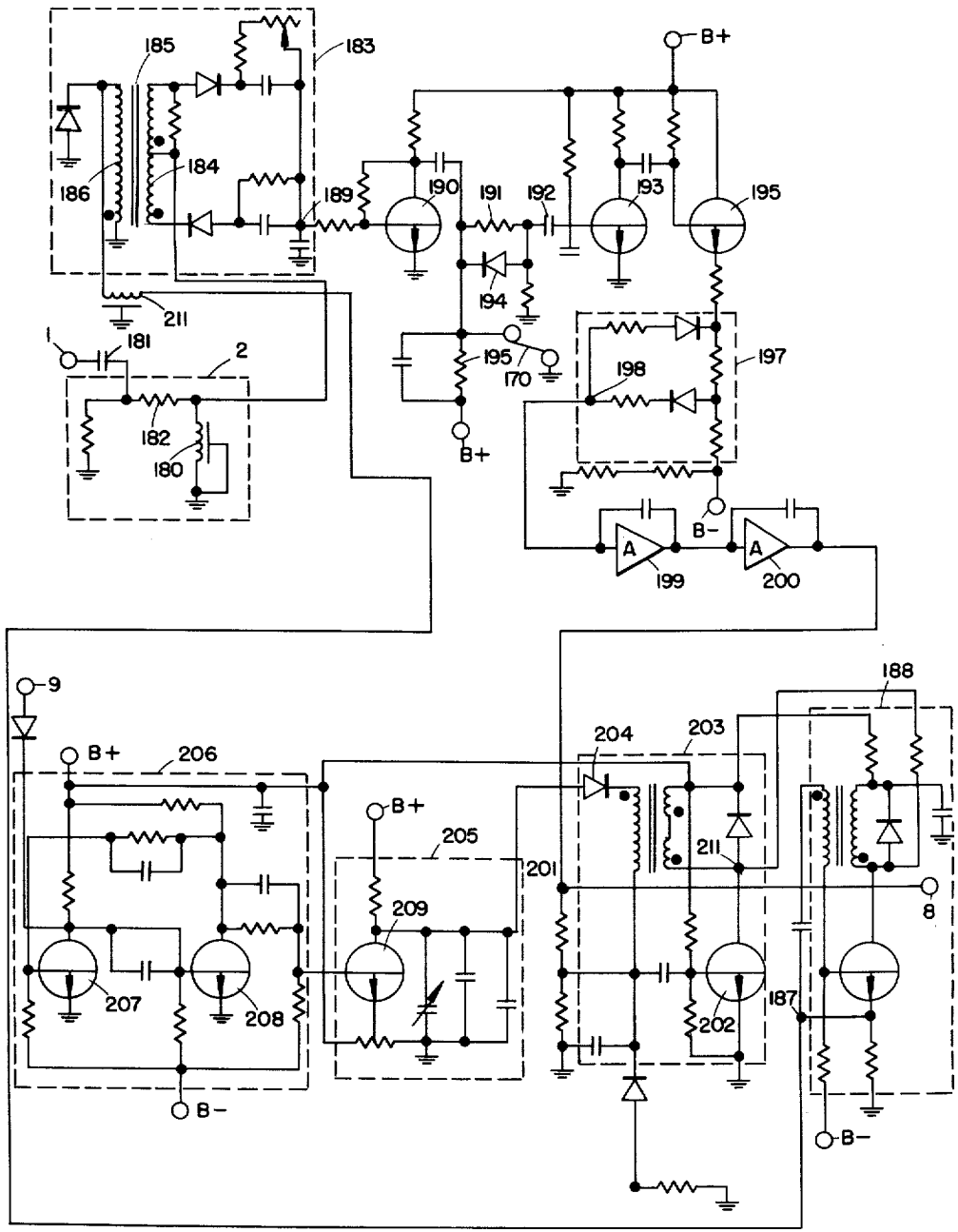
FIG. 5 is a schematic diagram of an embodiment of the invention utilizing transistor circuitry in the automatic tracking mode of operation.

Turning now to FIG. 5 there is shown a schematic diagram illustrating the automatic tracking mode of the computer utilizing transistor circuitry. Negative video pulses from the target are received at terminal 1 and bipolarized in bipolar generator 2 which consists of delay line 180 which receives a pulse from terminal 1 through capacitor 181 and resistor 182, converts the pulse into an amplified and inverted video pulse followed immediately by the reflection of the video pulse, and presents the signal to the input of bidirectional switch 183. Switch 183 receives the bipolar signal from generator 2 at the midpoint of the secondary winding 184 of transformer 185. The primary winding 186 of transformer 185 receives a delayed range gate signal from point 187 of blocking oscillator 188 and produces an output at point 189 which is an error signal proportional in amplitude and polarity to the difference between the bipolar video signal and the range gate signal. The error signal at point 189 is amplified by first error transistor amplifier 190 and coupled from the output of amplifier 190 through resistor 191 and capacitor 192 to the input of second error amplifier 193. A circuit between error amplifier 190 and error amplifier 193 is provided to control the gain of the time discriminator. The circuit comprises a diode 194 connected in parallel with resistor 191 to allow conduction before locking-on of the target. Resistor 195, connected at one end to diode 194 and receiving a B— signal through open contacts 170 of de-energized on-target relay 171 (not shown), biases diode 194 in the direction to allow conduction when contacts 170 are open and biases diode 194 in a reverse direction when contacts 170 are closed upon locking-on of a target and subsequent energizing of relay 171. Thus, a low impedance is created by shorting resistor 191 through diode 194 before lock-on, giving a high gain for the output of amplifier 190. After lock-on resistor 191 is not shorted, thereby producing a high impedance for the output of amplifier 190, reducing the gain of the detector output. Cathode follower transistor 195 receives the output signal from error amplifier 193 and presents it to peak detector 197 which produces an output signal at point 198 which is proportional to the tracking error between the video signal and the range gate signal. Error current from point 198 at the output of peak detector 197 is fed into the input of amplifier 199 which forms the rate integrator 5. Rate integrator 5 integrates the error current signal and produces an output signal which is proportional to the rate of change of the range of target. The output of rate integrator 5 is coupled to the input amplifier 200 which comprises range integrator 7. Amplifier 200 integrates the range rate signal and produces a signal at its output which is presented to point 201 as a signal which is proportional to the range of the target.

The range signal at point 201 is presented to output terminal 8 and also coupled to the input of transistor 202 of blocking oscillator 203. Blocking oscillator 203 receives a control signal through diode 204 from the output of sweep generator 205, is controlled by multivibrator 206 which comprises transistors 207 and 208. A positive trigger pulse from system trigger terminal 6 is received by the collector of transistor 207. The collector of transistor 208 is coupled to the grid of transistor 209 which is a sweep generator generating a linear rising signal at its collector in response to a signal from transistor 208. Blocking oscillator 203 produces a pulse at point 210 in the collector of transistor 202 when the potential of the output of sweep generator 209 is equal to the range voltage coupled to the grid of transistor 202. Point 210 in the output circuit of blocking oscillator 203 is coupled to the input of blocking oscillator 188 which is triggered and produces an output pulse at point 187 which is the range gate signal. The range gate signal from point 187 is fed through delay line 211 to primary winding 186 in detector 185 to be compared with the bipolar video signal.

In operation of the circuit of FIG. 5, it is assumed that the computer is operating in the automatic mode wherein the manual and search modes are disconnected from the circuitry and rate integrator 5 provides the signal to the input of range integrator 7 exclusively. A bipolar signal received from generator 2 is compared in bidirectional switch 183 with a range gate signal supplied by blocking oscillator 188 at point 187. The resulting positive or negative error signal at the output of switch 183 is amplified by error amplifiers 190 and 193 and fed to peak detector 197 which furnishes rate integrator 5 with an error current signal at point 198 which is proportional to the tracking error. Diode 194 between error amplifiers 190 and 193 switches the gain of the output of amplifier 190 from a high gain before lock-on to a low gain at lock-on. Thus, in the automatic mode being described, the gain of the output from amplifier 190 is reduced to provide smoother tracking at a low band width of the target. Range integrator 7 integrates the error signal fed to its input and produces a signal at output terminal 16 which is proportional to the range rate and also feeds the range rate input signal into range integrator 7 which produces a signal at output terminal 8 which is proportional to range. The range signal from terminal 8 is fed into one input of blocking oscillator 203, the other input being received from sweep generator 205 which is responsive to multivibrator 206. Upon coincidence in blocking oscillator 203 of the range signal and the output signal from sweep generator 205, range gate blocking oscillator 188, in response to the output signal from blocking oscillator 203, generates a range gate signal at point 187 which is fed back to switch 183 which again compares the range gate signal with the video signal and the circuit continues to produce error signals which are converted to signals proportional to range and range rate.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an automatic radar tracking system wherein video signals received by a radar from a target are converted into range and range rate signals, means responsive to said range signals for generating first range gate signals, automatic control means responsive to said video and first range gate signals for generating an error signal proportional to the rate of change of velocity of said target from said radar, said signal having a polarity indicating sense, first integrating means responsive to said error signals for generating signals proportional to the rate of change of the range of said target from said radar, second integrating means responsive to said first integrating means for generating signals proportional to the range of said target from said radar, manual control means for varying said range signals for generating second range gate signals, target control means responsive to said video and said first range gate signals for disconnecting said manual control means from said second integrating means when video signals are received from said target, means in said automatic control means responsive to said target control means for limiting said error signal.

2. In a range tracking computer wherein video signals received by a radar from a target are converted into range and range rate signals, means responsive to said range signals for generating range gate signals, comparison means responsive to said video and range gate signals for generating a first error signal proportional to the rate of change of velocity of said target from said radar, means responsive to said error signals for generating signals proportional to the range of said target from said radar, control means for generating a second error signal of predetermined magnitude, means for detecting coincidence between said video signals and said range gate signals, switch means responsive to said coincidence means for disconnecting said control means from said range generating means when coincidence is detected and for connecting said control means to said range generating means upon lack of coincidence, and means in said comparison means responsive to said coincidence circuit for varying the amplitude of the output of said comparison means, said means lowering the amplitude of the output a predetermined time after coincidence is detected.

3. In an automatic radar tracking system wherein video signals received by a radar from a target are converted into range and range rate signals, means responsive to said range signals for generating first range gate signals of equal recurrence rate but differing in time from said video signals, automatic control means responsive to said video and range gate signals for generating an error signal proportional in amplitude and polarity to the rate of change of velocity of said target from said radar, first integrating means responsive to said error signals for generating signals proportional to the rate of change of the range of said target from said radar, second integrating means responsive to said first integrating means for generating signals proportional to the range of said target from said radar, automatic search generating means for generating second range gate signals of equal recurrence rate but differing in time by a predetermined amount determined by said range signals and said search generating means from said video signals, target control means responsive to said video and said first range gate signals for disconnecting said manual control means from said second integrating means when video signals are received from said target, means responsive to said target control means for varying the duration of said error signal, and means responsive to said target control means for connecting the output of said search generating means to said second integrating means a predetermined time after coincidence is lost between said video signals and said first range gate signals.

4. The combination of claim 3 wherein is included means for detecting coincidence between said video signals and said first range gate signals and wherein said target control means is responsive to the output of said coincidence means whereby said search generator means is disconnected from said second integrating means upon coincidence between said video and said first range rate signals and whereby said search generating means is connected to said second integrating means when coincidence is not detected by said coincidence detecting means.

5. In a radar tracking system wherein video signals received by the radar from a target are converted into range signals, means responsive to said range signals for generating first range gate signals of equal recurrence rate with said video signals, time discriminator means responsive to said video and said first range gate signals for generating an error signal proportional in amplitude and polarity to the rate of change of velocity of said target from said radar, first integrating means responsive to said error signal for generating signals proportional to the rate of change of the range of said target from said radar, second integrating means responsive to said first integrating means for generating signals proportional to the range of said target from said radar, automatic search generating means for generating second range gate signals of equal recurrence rate with said video signals, means for detecting coincidence between said video signals and said first range gate signals, mechanical switch means responsive to said coincidence means for connecting said first integrator means to said second integrator means when coincidence is detected between said video signals and said first range gate signals, said mechanical switch means connecting said second range gate signals to said second integrator means when said video signals differ in time from said first range gate signals, and electronic switch means for disconnecting said second range gate signals from said second integrating means when coincidence is detected between said video signals and said first range gate signals.

6. The system of claim 5 wherein is included means responsive to said coincidence means for varying the duration of said error signal, said means connected to said time discriminator means to decrease the duration of said error signal when coincidence is detected between said video signals and said first range gate signals.

7. In a range tracking computer wherein video signals received by a radar from a target are converted into range signals, means responsive to said video signals for generating bipolar video signals, means responsive to said range signals for generating range gate signals, said range gate generating means comprising free-running multivibrator means, sweep generating means responsive to said multivibrator means for generating a timing signal proportional to range, first blocking oscillator means responsive to said sweep generating means and to said range signals for generating a signal when the output of said sweep generator is equal to said range signal, second blocking oscillator means responsive to said first blocking oscillator means for generating range gate signals, means for measuring the difference in time between said bipolar video signals and said range gate signals, first and second amplifier means responsive to said comparison means for limiting the output of said second amplifier means to a predetermined maximum amplitude, rate integrating means responsive to the output of said peak detector means for generating signals proportional to the rate of change of range of said target, and range integrating means responsive to said rate integrating means for generating signals proportional to the range of said target.

8. In a range tracking computer wherein video signals received by a radar from a target are converted into range signals, means responsive to said video signals for generating bipolar video signals, means responsive to said range signals for generating range gate signals, said range gate generating means comprising free-running multivibrator means, sweep generating means responsive to said multivibrator means for generating a timing signal proportion to range, first blocking oscillator means responsive to said sweep generating means and to said range signals for generating a signal when the output of said sweep generator is equal to said range signal, second blocking oscillator means responsive to said first blocking oscillator means for generating range gate signals, means for measuring the difference in time between said bipolar video signals and said range gate signals, first and second amplifier means responsive to said comparison means for limiting the output of said second amplifier means to a predetermined maximum amplitude, rate integrating means responsive to the output of said peak detector means for generating signals proportional to the rate of change of range of said target, range integrating means responsive to said rate integrating means for generating signals proportional to the range of said target, manual control means for supplying range gate signals of predetermined amplitude to said range integrating means, means for detecting coincidence between said video signals and said range gate signals generated by said second blocking oscillator means, switch means responsive to said coincidence means for disconnecting said manual control means from said range integrating means when coincidence is detected and connecting said manual control means to said range integrating means when coincidence is not detected.

9. The combination recited in claim 8 wherein said switch means comprises mechanical relay means for disconnecting said manual control means from said range integrating means upon coincidence and connecting said manual control means to said range integrating means upon lack of coincidence, and transistor switch means for connecting said manual control means to said range integrating means upon lack of coincidence and disconnecting said manual control means from said rate integrating means upon coincidence.

10. In a radar tracking system having video signals received from a target converted into range signals, the combination of time modulator means responsive to said range signals for generating range gate signals, automatic comparison means responsive to said range gate signals and said video signals for producing an error signal proportioned to the rate of change of range of said target from said radar, integrating means responsive to said error signals for generating signals proportional to the range of said target from said radar, search generating means for generating range gate signals, switch means for alternatively connecting the output of said automatic comparison means or the output of said search generating means to said integrating means, means for detecting coincidence between said video signals and the range gate signals generated by said time modulator means, said switch means responsive to said coincidence means whereby said automatic comparison means is connected to said integrating means when coincidence is detected between said video signals and the range gate signals generated by said time modulator means and whereby the output of said search generating means is connected to said integrating means upon loss of coincidence, and time delay means responsive to said coincidence means for connecting the output of said search generating means to said integrating means a predetermined time after coincidence is lost between said video signals and the range gate signals generated by said time modulator means.

11. The system of claim 10 wherein is included means connected to said comparison means to lower the amplitude of said error signal in response to signals from said coincidence means when coincidence is detected between said video signals and said first range gate signals.

12. In a range tracking computer for receiving video signals from a target and producing range signals the combination of time modulator means responsive to said range signals for generating range gate signals, time discriminator means responsive to said video signals and said range gate signals for producing an error signal proportional to the change in rate of the range of said target, rate integrating means responsive to said error signal for generating range rate signals proportional to the change in range of said target, range integrating means responsive to said range rate signals for generating range signals proportional to the range of said target, search generating means for generating range gate signals of equal recurrence rate but varying in time from said video signals, means for alternatively connecting said search generator means or said rate integrating means to said range integrating means, said alternatively connecting means comprising coincidence means for detecting coincidence between said video signals and said range gate signals generated by said time modulator means, first switch means responsive to said coincidence means for connecting said search generator means to said range integrating means, and second switch means responsive to said coincidence means for disconnecting said rate integrator means from said range integrating means when coincidence is lost between said video signals and the range gate signals generated by said time modulator means.

References Cited in the file of this patent
UNITED STATES PATENTS

| | | |
|---|---|---|
| 2,538,027 | Mosley | Jan. 16, 1951 |
| 2,836,810 | MacNichol | May 27, 1958 |